US008346938B1

(12) United States Patent
Caddes et al.

(10) Patent No.: US 8,346,938 B1
(45) Date of Patent: Jan. 1, 2013

(54) EFFICIENT ESTABLISHMENT OF WIRELESS CONNECTIONS

(75) Inventors: Scott Allen Caddes, Sandy, UT (US); Kenin Page, Sandy, UT (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1698 days.

(21) Appl. No.: 10/254,395

(22) Filed: Sep. 25, 2002

(51) Int. Cl.
*G06F 15/16* (2006.01)
(52) U.S. Cl. ........................ 709/227; 709/203; 455/556.2
(58) Field of Classification Search .................. 709/227, 709/228, 203; 455/41.2, 556.2; 707/769, 707/771
See application file for complete search history.

(56) References Cited

U.S. PATENT DOCUMENTS

| | | | |
|---|---|---|---|
| 6,408,232 B1 * | 6/2002 | Cannon et al. .................. | 701/29 |
| 6,549,625 B1 * | 4/2003 | Rautila et al. .................. | 380/258 |
| 6,731,939 B1 * | 5/2004 | Watanabe et al. .............. | 455/450 |
| 6,754,250 B2 * | 6/2004 | Haartsen ........................ | 375/132 |
| 6,795,421 B1 * | 9/2004 | Heinonen et al. .............. | 370/338 |
| 6,826,387 B1 * | 11/2004 | Kammer ....................... | 455/41.2 |
| 6,901,057 B2 * | 5/2005 | Rune et al. .................... | 370/310 |
| 6,968,178 B2 * | 11/2005 | Pradhan et al. ................ | 455/406 |

\* cited by examiner

*Primary Examiner* — Ario Etienne
*Assistant Examiner* — El Hadji Sall

(57) ABSTRACT

A method for storing information in a database pertaining to which wireless devices an application initiates and accepts communications from. The information from the database is utilized whenever an application attempts to establish a connection with an unconnected device. The method includes analyzing an application's purpose in requesting to open a wireless communication port. If the purpose is to initiate communications with a peripheral device, the method queries the database and then initiates a communication link with the appropriate device. If the purpose is to accept communications from a peripheral device, the method detects incoming wireless device signals and identifies their source. If the source is listed in the database as an accepted device for the application, a communication link will be established. If the device is not listed, the method will revert back to detecting incoming wireless device signals.

12 Claims, 3 Drawing Sheets

EFFICIENT ESTABLISHMENT OF WIRELESS CONNECTIONS

BACKGROUND OF THE INVENTION

1. The Field of the Invention

This invention relates generally to the field of wireless communication software. In particular, embodiments of the present invention relate to systems and methods for efficiently establishing wireless connections.

2. The Relevant Technology

Short range wireless communication schemes are increasingly used as an alternative to wire-based networks to interconnect computers and computer devices. The use of wireless communications provides a number of advantages, including the elimination of complex, expensive, and inconvenient wire-based connection schemes. While a number of wireless communications standards have been developed for such applications, one popular example is known as "Bluetooth." The Bluetooth standard uses low power radio frequencies to allow communication between various devices such as mobile phones, laptop and desktop computers, printers, modems, PDAs, etc. This technology was originally envisioned for the purpose of replacing cabling and other hard-wired connection schemes used to connect auxiliary devices to a desktop or laptop computer. However, Bluetooth has further evolved into a method of sending both data and voice signals between a wide range of devices. For example, a Bluetooth-enabled PDA can be configured to automatically connect to a Bluetooth-enabled communications line within a building, therefore gaining wireless access to computing resources, such as printers, an Internet portal, etc.

In an effort to ensure compatibility among Bluetooth implementations, a Bluetooth special interest group (SIG) was formed. One of the main objectives of the Bluetooth SIG is to formulate a standardized specification for every element of Bluetooth. The specification dictates numerous software and hardware characteristics so that devices made by different manufacturers will be compatible with one another. The specification dictates all aspects of Bluetooth technology from the software stack necessary to run Bluetooth devices to the actual hardware requirements.

As per this standard, Bluetooth compatible technology is composed of multiple components that together provide for wireless communication capabilities. For example, each Bluetooth-compatible device is configured with a radio that can transmit and receive wireless signals on a particular frequency band. In addition, there are certain structural elements required for connecting the radio to the specific host device. Further, each Bluetooth-compatible device is also configured with particular software to allow the device to properly process and route data or voice signals. This software is typically referred to as the "protocol stack" because it is composed of numerous components that are each configured to perform a particular function. Information is generally passed between the respective layers of the stack either from the bottom of the stack to the top or vice versa, depending on the direction of the communication involved. The protocol stack is further broken up into a "transport protocol group," a "middleware protocol group" and an "application protocol group."

In general, the transport protocol group includes functional components that are designed to allow Bluetooth devices to locate one another within a Bluetooth network, and to manage the links that allow higher layer protocols and applications to pass data through the transport protocols. The transport protocol group is comprised of a radio, a baseband controller, a link manager, a logical link control and adaptation protocol (L2CAP), and a host controller interface (HCI). The baseband controller defines how devices search for one another and how they connect to one another via a Bluetooth Device Discovery and Connection process. The baseband controller also defines the master and slave roles between devices. The link manager supervises the creation of pairing between devices and the encryption of data. The link manager also supervises power control among devices. For example, the link manager can initiate a low power adjustment between devices to conserve energy. The L2CAP supports the protocol multiplexing that allows multiple protocols to utilize the same air-interface. It also maintains the desired level of service among devices. The HCI allows higher layers of the stack to access the baseband controller and link manager. The HCI is not a required part of the Bluetooth specification and it can be located above or below the L2CAP depending on the configuration of the particular Bluetooth system. The radio, link manager and baseband controller are sometimes grouped together to form what is referred to as a Bluetooth module. The remaining components of the transport layer are typically located on the actual Bluetooth host device.

The middleware protocol group is directed to functionality that facilitates communication between host applications and the Bluetooth module. The protocols can include both third-party protocols and industry standard protocols specified by the Bluetooth SIG. The middleware protocol group specifically includes a RFCOMM, a service discovery protocol (SDP), a set of IrDa object exchange protocols, and a telephony control protocol (TCS). The RFCOMM protocol creates virtual serial ports to facilitate the replacement of cables with a wireless Bluetooth interface. The SDP protocol defines a standard method for Bluetooth devices to discover and learn about the services offered by other Bluetooth devices within the network. The SDP protocol is often utilized by other protocols for the purpose of identifying what services are available over a wireless air interface. The set of IrDa interoperability protocols helps to define the syntax of the data to be exchanged between devices. The TCS protocol is designed to control the exchange of voice communications between devices.

The application protocol group consists of the various applications that utilize Bluetooth communications. The applications may be unaware that data is being transmitted over a Bluetooth air-interface rather than a standard cable, or the application may be specifically designed to interact with Bluetooth devices.

Bluetooth devices form what are known as "piconets" with one another. A piconet is comprised of one Bluetooth device acting as a master and one or numerous other devices acting as slaves. Both the master and the slave device(s) can transmit and receive data from one another. However, the master device defines the data hopping sequence and is usually the device that initiates the communication. Initiation of a communication depends, in part, on the configuration state of a device. For example, an "active state" is a system configuration in which the slave device is always listening for transmissions from the master. In a "parked state" the slave device is only periodically listening to the master. Thus, a parked slave must become active before it can communicate normally with the master. In addition, there is a sniff state and a hold state, both of which are considered active states. The hold state is used as an alternative to the full active state for the purpose of conserving power. A slave device in a sniff mode essentially communicates with the master at regular intervals rather than always listening. A slave device in a hold mode essentially stops listening to the master for a specified period of time.

Whenever a new wireless device is developed to interface with existing Bluetooth devices, a complete protocol stack must be created. The protocol stack allows the device to communicate with other wireless devices over an air interface. A protocol stack for an individual device is tailored to incorporate the particular protocols and applications which it requires for operation. Some of these protocols are only for the wireless communications. For example, a printer must utilize a particular protocol to obtain the data from the foreign device which it is printing. Each of the applications created for the device further include wireless protocol commands pertaining to the establishment of the wireless link between one or more devices. These commands must conform to a specific format in order to ensure compatibility with other devices.

In a Bluetooth wireless networking environment, applications from the Application Group communicate with various peripheral devices that may or may not be connected over a Bluetooth air-interface. For example, an application may communicate with a printer that is directly connected to the host computer within which the application resides; or alternatively, the application may communicate with a modem that is connected over a Bluetooth air-interface. The peripheral devices are used to perform functions that the application cannot perform independently such as printing a document, transferring information over a phone line, etc. If the device used by a particular application is actively connected over a Bluetooth air-interface it is said to be connected to a Bluetooth communication port (corn port), virtual corn port or a virtual serial port. A communication port must therefore be opened whenever an application wishes to communicate with a wireless device that is not already actively communicating with the host computer in which the application resides. When an application initially tries to transmit data to a wireless device, the request is processed by a Bluetooth connection initiator. The initiator typically has no way of knowing which of the devices within the piconet the application wishes to communicate with. This ambiguity typically results in either a long trial and error process or a user information request before the application can efficiently communicate with the proper device. Likewise, when an application makes an initial request to receive data from a wireless device, the request is processed by a Bluetooth connection acceptor which also has no way to know which of the many wireless devices in the piconet the application wishes to receive data from.

Therefore, there is a need for an improved Bluetooth protocol stack that is capable of storing peripheral device information for each application. In addition, the software stack should be capable of establishing a connection with the proper device or application based upon the stored information without requesting user information or interrupting communications. Such a protocol stack should provide a host system with more versatility over Bluetooth architecture and efficiency of Bluetooth communications.

BRIEF SUMMARY OF THE INVENTION

These and other problems in the prior art are addressed by embodiments of the present invention, which relates to an improved wireless protocol stack configured to store information pertaining to which device(s) a particular application typically communicates with and accepts communications from. In addition, the present invention includes a method for efficiently establishing connection with peripheral devices based on the device information stored. Therefore, the protocol stack of the present invention increases the overall efficiency of communications to and from a Bluetooth communication port by utilizing stored information and efficiently establishing connections with the proper application or device based on the stored information.

In one Bluetooth embodiment, a method for efficiently establishing connections with a peripheral device is implemented into a standard host controller interface. The method includes creating a database for each application comprising the Bluetooth devices that the particular application will communicate with and accept communications from. In addition, the method includes implementing a logical sequence of steps for analyzing all application requests to open a virtual corn port. Initially, the logical sequence determines whether the purpose of the new corn port is to initiate or accept communications with a Bluetooth device. If the purpose is to initiate communications with a Bluetooth device, the logical sequence proceeds to query a database for Bluetooth devices with which the application initiates communications with. A communication link is then efficiently established with the appropriate device. If the purpose of the application is to accept communications from a Bluetooth device, the logical sequence proceeds to detect incoming wireless signals from Bluetooth devices. Once a particular communicating device is identified through receiving wireless signals, the logical sequence queries the database to determine if the communicating device is one of the application's accepted devices. If the communicating device is listed as being accepted, a communication link is established; if the communicating device is not listed, the logical sequence reverts back to detecting for another incoming wireless signal from a different Bluetooth device.

Thus, the present invention provides a number of benefits and advantages over the prior art by creating a device database for each application including the particular wireless devices which the particular application communicates with and receives communications from. The database in turn allows the protocol stack to efficiently identify wireless devices to establish communications with. Whereas, the prior art method of determining which wireless devices to communicate with relies in part on a trial and error process that is inefficient and problematic. The efficient connection process in turn results in the entire wireless network being utilized in a more productive and efficient manner.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be given by making reference to a specific embodiment that is illustrated in the appended drawings. These drawings depict only one embodiment of the invention and are not to be considered limiting of its scope.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates to an improved wireless protocol stack configured to store information pertaining to which device(s) a particular application typically communicates with and accepts communications from. In addition, the protocol stack is configured to establish connections with peripheral devices according to the information stored in reference to the application initiating the communication request. Therefore, the protocol stack of the present invention increases the efficiency of establishing wireless connections by storing information in a database and efficiently establishing connections based on the stored information with the proper application or device. This versatility allows for additional features and increased communication efficiency.

For purposes of illustration, embodiments of the present invention are described in the context of a Bluetooth-based wireless computer network. However, it will be appreciated that the teachings of the present invention are applicable to other applications and network environments as well. For example, a similar method could be implemented in connection with other types of networks and wireless environments and standards.

Figure 1:
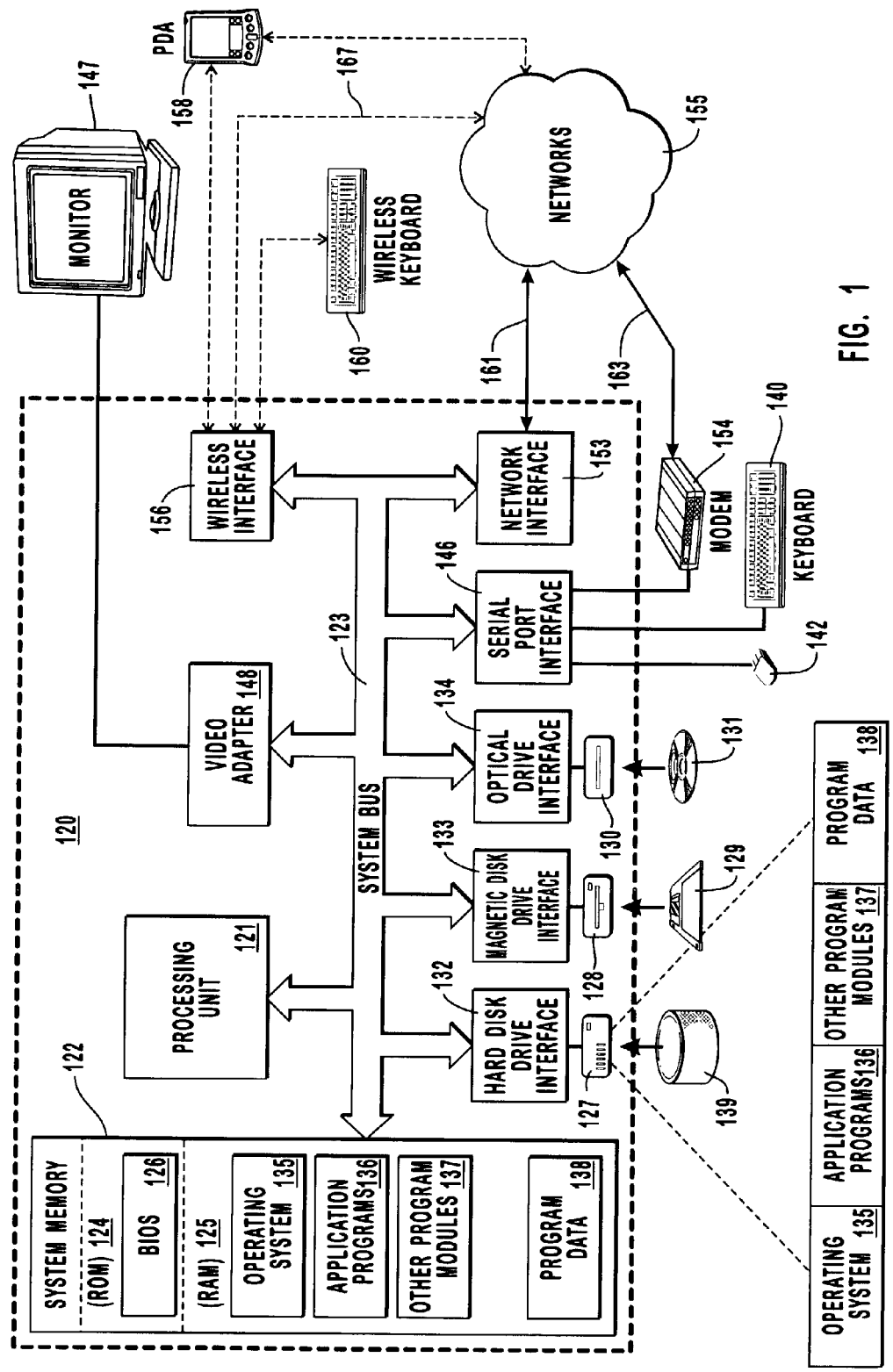
FIG. 1 illustrates a processing system that provides an example of one suitable operating environment for embodiments of the present invention.

FIG. 1 and the following discussion are intended to provide a brief, general description of an example of a suitable computing environment in which embodiments of the present invention may be implemented. Although not required, embodiments of the invention may be described in the general context of computer-executable instructions, such as program modules, being executed by computers operating within network environments. Generally, the term "program modules" is intended to include, without limitation, routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 1, an example system for implementing embodiments of the invention includes a general-purpose computing device, one example of which is shown in the form of a conventional computer 120. Computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and/or an optical disk drive 130 for reading from or writing to removable optical disk 131 such as a CD-ROM or other optical media. In this particular example, the magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Of course, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 and/or RAM 125. Examples include an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a wireless interface, a parallel port, a game port, a universal serial bus (USB) and the like. A monitor 147 or another display device is also connected to system bus 123 via an interface, such as video adapter 148. In addition to the monitor, some computers may include other peripheral output devices (not shown), such as speakers and printers.

The computer 120 may be operatively connected to a networked environment, an example of which is designated in FIG. 1 as network 155. As is well known, network 155 may be used to connect computer 120 to other remote computers, which may be personal computers, servers, routers, network PCs, peer devices or other common network nodes, and typically include many or all of the elements described above relative to the computer 120. Examples of various logical connections to network 155 are depicted in FIG. 1 include a wireless network 167, a wired local area network (LAN) 161, and a wide area network (WAN) 163. Each of the logical connections 167, 161, 163 represent a different way for the computer 120 to connect to the network 155. The wireless network 167 may utilize radio frequencies, microwaves, infrared light, etc. to transmit signals via the wireless interface 156 to the network 155. The wire-based LAN 161 utilizes, for example, an Ethernet, a USB network, or a token ring network to transmit signals from the network interface 153 to the network 155. The WAN 163 utilizes a modem 154 to decode the signals and a standard telephone line, wireless telephone line, coaxial cable, or fiber optic cable to transmit the signals from the serial port interface 146 to the networks 155. Such networking environments are commonplace in office-wide or enterprise-wide computer networks, intranets and the Internet.

By way of example, the wireless interface 156 could be implemented as a short range radio transceiver that preferably utilizes low power radio frequencies to transmit information over relatively short distances. For example, the wireless interface could be implemented as a Bluetooth or an 802.11 transceiver module, or any other equivalent type of wireless transceiver that is capable of wireless communication. In this way, the wireless interface 156 could be used to wirelessly connect the computer 120 to a wide range of external devices, computing devices, networks, etc. For example, a Bluetooth module may be connected to the computer 120 to allow for a wireless connection between the computer 120 and a PDA 158 similarly equipped with a Bluetooth module. In addition, the wireless interface 156 can connect to devices that typically use other interfaces when communicating with the computer 120. For example, keyboards are typically connected to the computer 120 via the serial port interface 146, but may also be connected with a Bluetooth module. To do so, the wireless interface 156 typically includes a protocol that is capable of emulating a standard wired communication interface, such as a serial port. For example, in a Bluetooth system, the RFCOMM protocol can be used to provide virtual serial ports so that serial devices can be wirelessly connected to the computer 120 via the wireless interface 156 without extensive manipulation of existing software drivers, application software, etc.

For purposes of illustration, wireless transceiver module 156 in FIG. 1 is implemented as a Bluetooth compatible wireless transceiver or radio. As previously discussed, a Bluetooth transceiver device 156 is configured with a radio that can transmit and receive signals on a particular frequency band. In addition, the device is typically programmable, and is configured with software to process and route wireless signals. This software is implemented as a protocol stack, which is comprised of functional components that are organized within adjacent layers to form a logical stack. Also, depending on the implementation scheme, certain of the components of the stack reside within the host device (such as computer 120) memory and are executed by the host processor (121 in FIG. 1), and other components of the stack are stored and executed at the Bluetooth module itself (e.g., 156 in FIG. 1).

Figure 2:
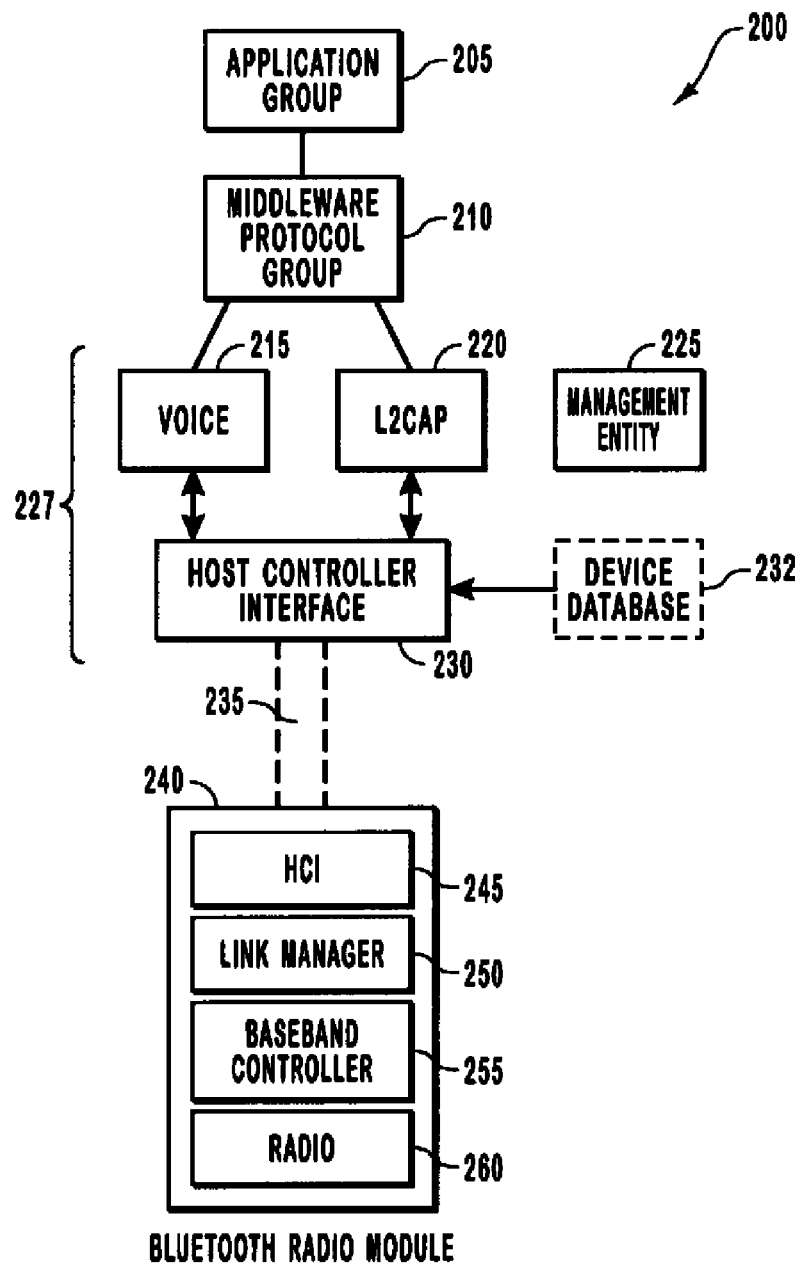
FIG. 2 illustrates a simplified functional block diagram of an example of a Bluetooth protocol stack, implemented in accordance with the teachings of the present invention.

Reference is next made to FIG. 2 which illustrates a simplified functional block diagram of an example of a Bluetooth protocol stack, designated generally at 200. In the illustrated example, the protocol stack 200 is comprised of multiple sub-elements which are vertically positioned to indicate a sequence of communication. Typically, information is passed either from the bottom to the top or vice versa. The uppermost element of the protocol stack 200 is the Application Group 205. The Application Group 205 represents the higher level applications that directly interact with the user. The applications often send commands to devices that may be connected via a Bluetooth radio such as a printer, a modem, a fax, etc. The next element down in the protocol stack 200 is the Middleware Protocol Group 210. The Middleware Protocol Group 210 represents the various protocols that are used as channels between the upper Application Group 205 and the lower levels of the protocol stack 200. These protocols include TCP, TCS-BIN, PPP, etc. The applications in the Application Group 205 may use one or more of the protocols in the Middleware Protocol Group 210 to communicate with the lower levels 227 of the protocol stack 200. The remainder of the flow chart shown in FIG. 2 represents the lower levels 227 of the protocol stack 200.

As is further shown in FIG. 2, A Host Controller Interface (HCI) 230 is located within the lower level 227 of the protocol stack 200 and within the Bluetooth module 240. The upper HCI 230 is also connected to a device database 232. The device database 232 stores the identities of multiple wireless devices which each of the applications connect with. For example, the database lists a wireless printer and scanner as corresponding to a word processing application; and it may also list a modem and fax machine as corresponding to a communications application. The devices listed in the database include both devices to receive data from and transmit data to. For example, a printer is a device that data is transmitted to whereas a scanner is a device that data is received from. The particular process for creating the database includes requesting that a user select the default devices to utilize for particular applications. Alternatively, an automatic selection process could be used such as automatically utilizing a device with the proper features that is closest in proximity to the requesting device. For example, if a user requests that a particular document be printed and the database does not contain a device for this operation, the closest device with the capability of printing will be assigned to the database until a user overwrites it. The device database 232 is used by the upper HCI 230 in determining which wireless device to establish a connection with when opening a communication port. In a wireless communication scheme a communication port is merely a virtual software based step that is performed to emulate the processes that a standard hardware based communication port perform. For example, a handshaking procedure may be performed between two wireless devices in the same way hardware ports include handshaking procedures. By emulating a hardware port, a virtual port can be easily utilized by an existing legacy application without any manipulation. Therefore, the legacy application can utilize the wireless devices that are virtually connected to the virtual communication port.

The upper and lower HCIs 230 245 create a standardized interface between the lower level 227 of the protocol stack 200 and the Bluetooth radio module 240. The standard interface is designed to allow for compatibility among Bluetooth module manufacturers. The connector 235 connects the Bluetooth radio module 240 to the lower level 227 of the protocol stack 200. The connector 235 is preferably a standard connector such as USB, serial, parallel, PC board, etc. The Bluetooth radio module 240 further comprises a HCI 245, a Link Manager 250, a Baseband Controller 255 and a Radio 260. The Link Manager 250 manages the properties of the air interface between the Bluetooth devices. The Baseband controller 255 manages how the Bluetooth devices talk to one another. And the radio 260 transmits and receives the low power radio signals across the air interface between Bluetooth devices.

Figure 3:
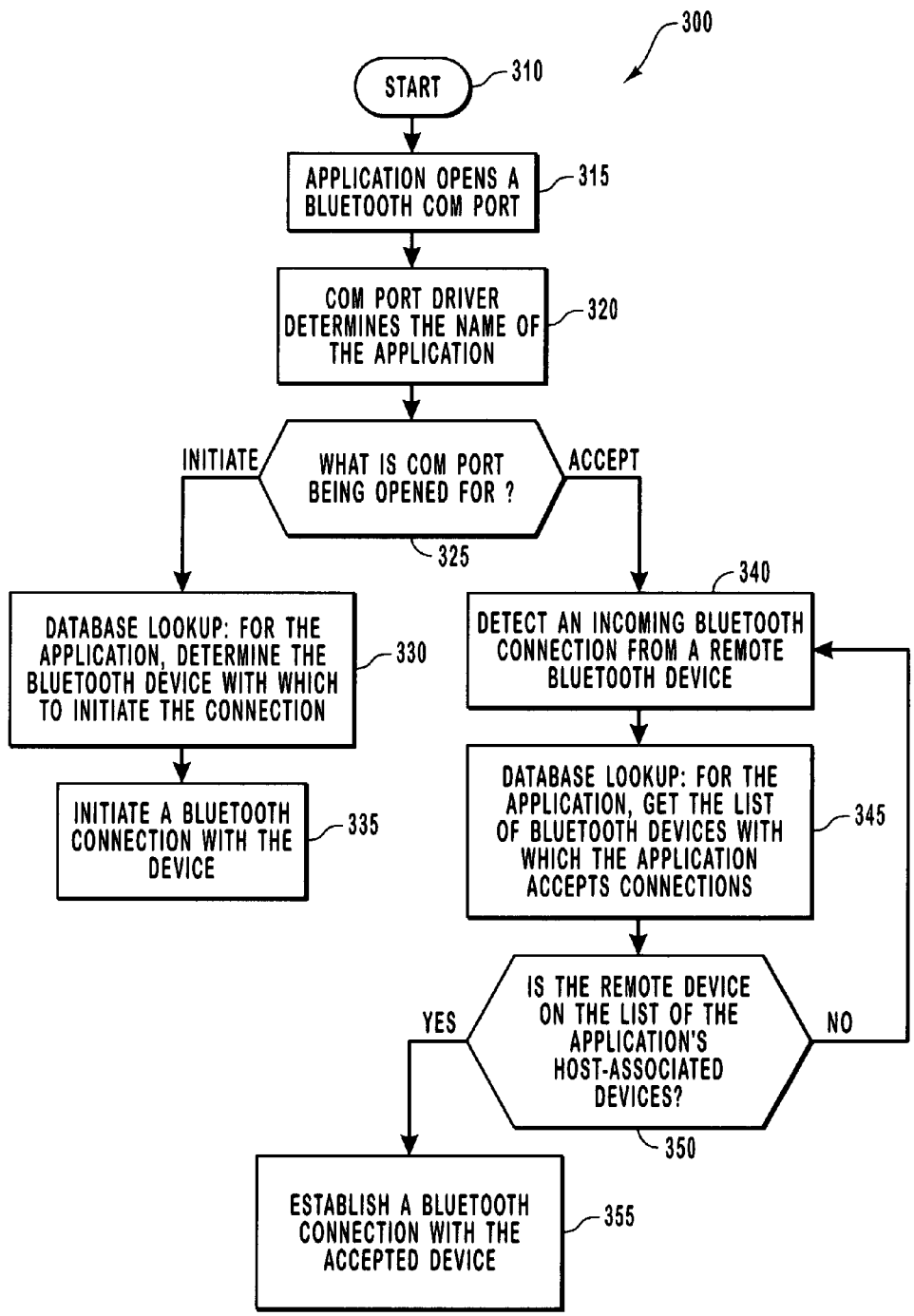
FIG. 3 illustrates a logical flow chart of one presently preferred Bluetooth embodiment of a method for utilizing a database to efficiently establish a Bluetooth connection with a wireless device.

Reference is next made to FIG. 3, which illustrates a logical flow chart of one Bluetooth embodiment of a method for utilizing a database to efficiently establish a Bluetooth connection with a wireless device, designated generally at 300. The logical flow 300 is organized to flow from the top-down wherein each step is performed before moving on to the next. The flow chart 300 represents a logical software/firmware based process that is preferably incorporated in the HCI 230 represented in FIG. 2. Alternatively, the process could be added to another element of the standard protocol stack and still achieve the intended purpose. This process is performed every time an application opens up a Bluetooth com port to initially communicate with a device connected over a Bluetooth air-interface. For example, when a text editor sends an initial print command to an unconnected wireless printer, this process will be implemented. Once the application establishes a direct communication channel with the printer, the printer becomes an active device and the logical flow 300 is no longer used. Additionally, this process is performed every time an application sends a connection response to accept communications from other devices. For example, when a text editor sends a communication response to accept communications from a text recognition scanner connected over an air-interface the logical flow 300 is used to properly establish a wireless connection with the text recognition scanner.

As is further shown in FIG. 3, The process begins at the start 310. The start 310 element simply refers to the start of the process for either an application initiating a wireless communication or accepting a wireless communication with an unconnected device. The application initially opens a virtual com port 315. A virtual corn port or corn port is a port dedicated to Bluetooth wireless devices that acts like a standard physical com port. A physical com port connects to a single peripheral device with a wire, while a Bluetooth com port connects wirelessly to any one of many peripheral devices. The com port driver determines the name of the application 320 making the request. It is important to identify the application originating the connection request because certain applications regularly communicate with certain devices. The process 300 then determines whether the com port is being opened for initiating a communication with a peripheral Bluetooth device or accepting a communication from a peripheral Bluetooth device 325. If the purpose of the com port is to initiate a communication with a peripheral Bluetooth device, the process continues with element 330. In element 330 a database is queried to determine which device the application intends to initiate the communication with. The database is the device database 232 illustrated in FIG. 2. The database stores a list of Bluetooth device identifiers and the particular applications that connect with the devices. The devices stored in the database can be either automatically generated or manually selected by a user. A user may wish to specify the exact devices which he or she wishes to be utilized by particular applications. This database query saves considerable trial and error that may be necessary for the Bluetooth module to determine which peripheral device the application intends to communicate with. In addition, the database query automates a step that may typically require a user request for information. Once the particular peripheral device is identified the process proceeds to initiate a communication link with the intended device 335.

As is further shown in FIG. 3, if the purpose of the com port 325 is determined to be for the purpose of accepting communications from a peripheral Bluetooth device, the logical flow 300 proceeds to detect incoming Bluetooth communications from peripheral Bluetooth devices. If the Bluetooth protocol stack is receiving communications, an external device is transmitting wireless data signals. A database is then queried to determine which devices the application accepts communications from 345. The database stores a list of application names which are associated with Bluetooth device identifiers with which the application wants to accept Bluetooth connections from. This database query saves considerable time by having the capability to immediately determine whether a communicating peripheral device will be accepted by the application 350. If the peripheral device is not listed as being accepted by the application, the process reverts back to element 340 to detect other incoming communications from peripheral devices. If the peripheral device is listed as being accepted by the application, a connection is established between the application and accepted device 355.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a host computing device having a wireless radio module, a method for establishing a wireless connection between an application and a peripheral device, the method comprising the steps of:
    determining the identity of said application, said application originating the connection to said peripheral device;
    analyzing the purpose of said application in originating the connection to determine whether the purpose of the said application in originating the connection is to initiate a communication with the peripheral device or to accept wireless communications from the peripheral device;
    determining whether the peripheral device is identified in a database of host devices associated with the application, if the purpose of said application in originating the connection is to accept wireless communications from the peripheral device; and
    establishing the wireless connection between the application and the peripheral device, if the peripheral device is identified in the database of host devices associated with the application.

2. The method of claim 1, wherein the identity of the application originating the connection is the name of the application originating the connection.

3. The method of claim 1, wherein the connection is a wireless communication port dedicated to a particular peripheral device.

4. The method of claim 1, wherein the database includes information about which wireless devices the application initiates with and accepts communications from.

5. The method of claim 1, wherein the method further comprises the step of:
    if the step of analyzing the purpose of the application in originating the connection determines the purpose to be to accept wireless communications with a peripheral device, detecting incoming signals from wireless devices.

6. In a host computing device having a Bluetooth radio module, a method for establishing a Bluetooth connection between an application and a peripheral device, the method comprising the steps of:
    determining the identity of said application, said application originating the Bluetooth connection to said peripheral device;
    analyzing the purpose of said application in originating the Bluetooth connection to determine whether the purpose of the said application in originating the Bluetooth connection is to initiate a communication with the peripheral device or to accept Bluetooth communications from the peripheral device;
    if the purpose of said application in originating the Bluetooth connection is to accept wireless communications from the peripheral device, determining whether the peripheral device is identified in a database of host devices associated with the application; and establishing the Bluetooth connection between the application and the peripheral device, if the peripheral device is identified in the database of host devices associated with the application.

7. The method of claim 6, wherein the identity of the application originating the Bluetooth connection is the name of the application originating the Bluetooth connection.

8. The method of claim 6, wherein the Bluetooth connection is a Bluetooth communication port dedicated to a particular Bluetooth device.

9. The method of claim 6, wherein the database includes information about which Bluetooth devices the application initiates with and accepts communications from.

10. The method of claim 6, wherein the method further comprises the step of:
- if the step of analyzing the purpose of the application in originating the Bluetooth connection determines the purpose to be to accept communications with a peripheral device, detecting incoming signals from wireless devices.

11. The method of claim 1, further comprising:
- in response to a determination that the peripheral device is not identified in the database of host devices associated with the application, detecting other incoming communications from another peripheral device.

12. The method of claim 6, further comprising:
- in response to a determination that the peripheral device is not identified in the database of host devices associated with the application, detecting other incoming Bluetooth communications from another peripheral device.

* * * * *